United States Patent [19]

Thomas et al.

[11] Patent Number: 4,464,487

[45] Date of Patent: Aug. 7, 1984

[54] PROCESS FOR PREPARING ADDITIVE CONCENTRATES FOR CARBONATE POLYMERS

[75] Inventors: Lowell S. Thomas; William P. Paige, both of Midland, Mich.

[73] Assignee: The Dow Chemical Company, Midland, Mich.

[21] Appl. No.: 450,714

[22] Filed: Dec. 17, 1982

[51] Int. Cl.$^3$ .......................... C08K 3/00; C08K 3/10; C08L 69/00

[52] U.S. Cl. ...................................... 521/90; 524/413; 524/508; 525/146; 525/147; 525/148; 523/351

[58] Field of Search .................. 521/90; 524/508, 413; 525/146–148; 523/351

[56] References Cited

U.S. PATENT DOCUMENTS

| | | | |
|---|---|---|---|
| 3,239,582 | 3/1966 | Keskkula | 260/873 |
| 3,755,244 | 8/1973 | Hart | 264/117 |
| 3,925,301 | 12/1975 | Engel et al. | 523/348 |
| 3,989,770 | 11/1976 | Prinz et al. | 525/302 |
| 4,001,035 | 1/1977 | Ito et al. | 106/308 M |
| 4,097,425 | 6/1978 | Niznik | 521/90 |
| 4,148,842 | 4/1979 | Yu et al. | 525/67 |
| 4,163,762 | 8/1979 | Rudd | 525/67 |
| 4,343,912 | 8/1982 | Lim | 521/90 |
| 4,373,067 | 2/1983 | Dieck et al. | 524/508 |

FOREIGN PATENT DOCUMENTS 2105487 8/1972 Fed. Rep. of Germany .

OTHER PUBLICATIONS

Derwent Abs. 76950e/37 (9/82), BASF AG DE3206184.
Derwent Abs. 25340x/14 (2/1976), Teijin Chem. J51020245.
Derwent Abs. 21401w/13 (2/1975), Teijin Chem. FR2233156.
Derwent Abs. 30654b/16 (3/1979), Sumitomo J54032578.

Primary Examiner—Herbert J. Lilling

[57] ABSTRACT

Carbonate polymer compositions comprise a carbonate polymer having dispersed therein a concentrate consisting essentially of a copolymer of an alkenyl-aromatic monomer and an $\alpha,\beta$-olefinically unsaturated nitrile monomer and a powdered or crystalline additive. The concentrates allow for good dispersion of additives in the carbonate polymer, provide for clean and efficient use of additives, and are easily processable. The copolymeric base resin does not deleteriously affect the good physical properties of the carbonate polymer with which it is blended at typical additive let down levels.

9 Claims, No Drawings

PROCESS FOR PREPARING ADDITIVE CONCENTRATES FOR CARBONATE POLYMERS

BACKGROUND OF THE INVENTION

The present invention relates to carbonate polymer compositions comprising a carbonate polymer and dispersed therein a base concentrate material.

Carbonate polymers derived from reactions of dihydroxyorganic compounds, particularly the dihydric phenols, and carbonic acid derivatives such as phosgene have found extensive commercial application because of their excellent physical properties. These thermoplastic polymers are suitable for the manufacture of molded parts wherein impact strength, rigidity, toughness, heat resistance and excellent electrical properties are required. It has been common industry practice to color such thermoplastic resins during the processing steps by using either color concentrates or so-called "dry color methods."

"Dry color" is the name conventionally given to colorants treated or coated with dispersing aids, such as stearic acid. Dry color can be added to virgin resin by preblending with the color pellets or by metering into the virgin pellet feedstream. Handling dry color is a dusty and dirty operation, and the degree of dispersion of the color pigment in the finished processed article is not always satisfactory. Moreover, it is difficult to achieve color uniformity in the parts produced.

As an alternative to dry color, resin processors sometimes use so-called precolored resins, supplied by the manufacturers of the resin. Precolored resin contains the desired amount of pigment already dispersed into the resin pellets in order that articles made from it have the desired shade and color.

Color concentrates are dispersions of colorants in a base resin, usually the same type of resin as the processed resin and are usually used in pellet form, at colorant concentrations of from about 5 to about 60 weight percent. The processor must either preblend the color concentrate pellets with the virgin resin pellets, or meter the color concentrate pellets into the natural resin pellet feedstream at concentrations of from about 0.2 to about 10 percent by weight. This is necessary in order to reduce the colorant concentration in the finished processed article to the desired level, usually from about 0.01 to about 3.0 weight percent.

Although there exist advantages in using additive concentrates to the compounding tasks associated with the manufacture and processing of carbonate polymer products, there are many other limitations. One such limitation is that compounding machinery must operate at relatively high temperatures, sometimes in excess of 300° C. Also, the power requirements of compounding devices in processing carbon polymers are two to three times that employed in the processing of styrenic and olefinic base concentrates. Further, the fact that carbonate polymer base resins must be thoroughly dried before processing into a concentrate also adds to processing costs. In addition, trace impurities such as chloride ions, iron and the like, varying pH levels, or reactive species in the additives which can complex with phenolic species in the carbonate polymer resin can cause severe molecular weight degradation and yellowing of a concentrate made with carbonate polymer base resins.

In view of the deficiencies of conventional dry color techniques and carbonate polymer base concentrates, it would be highly desirable to provide a carbonate polymer composition comprising an alternative base concentrate without sacrificing the excellent properties of the carbonate polymer in the end product.

SUMMARY OF THE INVENTION

The present invention is a carbonate polymer composition comprising (1) a carbonate polymer having dispersed therein (2) a base concentrate consisting essentially of a functionally effective amount of a copolymer of an alkenylaromatic monomer and an $\alpha,\beta$-olefinically unsaturated nitrile monomer and, (3) a powdered or crystalline additive. As used herein "base" or "base resin" refer to the polymeric species with which the powdered or crystalline additive is blended, and "base concentrate" refers to the base resin and the blended mixture of the powdered or crystalline additive dispersed therein.

The base concentrate of the present invention can be prepared at lower extrusion temperatures than base concentrates comprising carbonate polymers and flow more easily than carbonate polymers at typical carbonate polymer processing temperatures. The good flow characteristics of the base concentrate allow for good dispersion of the additive in the carbonate polymer.

The carbonate polymer blends of this invention are suitably employed in most applications in which carbonate polymers and various rubber modified polymers have previously been utilized. Applications of particular interest for these carbonate polymer blends are housings for electrical appliances, radio and television cabinets, automotive equipment including ornaments, business machine housings and the like.

DETAILED DESCRIPTION OF THE INVENTION

The carbonate polymers employed in the present invention are advantageously aromatic carbonate polymers such as the trityl diol carbonates described in U.S. Pat. Nos. 3,036,036; 3,036,037; 3,036,038 and 3,036,039; carbonate polymers of bis(ar-hydroxyphenyl)alkylidenes (often called bisphenol-A type diols) including their aromatically and aliphatically substituted derivatives such as disclosed in U.S. Pat. Nos. 2,999,835; 3,028,365 and 3,334,154; and carbonate polymers derived from other aromatic diols such as described in U.S. Pat. No. 3,169,121.

It is understood, of course, that the carbonate polymer may be derived from two or more different dihydric phenols or a copolymer of a dihydric phenol with a glycol or with a hydroxy or acid terminated polyester or with a dibasic acid in the event a carbonate copolymer or interpolymer rather than a homopolymer is desired. Also suitable for the practice of this invention are blends of any of the above carbonate polymers. Also included in the term "carbonate polymer" are the ester carbonate copolymers of the types described in U.S. Pat. Nos. 3,169,121; 4,330,661 and 4,105,633. Of the aforementioned carbonate polymers, the carbonate polymers of bisphenol-A and derivatives, including cocarbonate polymers of bisphenol-A, are preferred. Methods for preparing carbonate polymers for use in the practice of this invention are well known, for example, several suitable methods are disclosed in the aforementioned patents which are hereby incorporated by reference in their entirety.

The base of this invention is a copolymer of an alkenylaromatic monomer and an $\alpha,\beta$-olefinically unsaturated nitrile. Suitable α,β-olefinically unsaturated nitriles have the structure

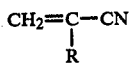

wherein R is hydrogen, lower alkyl or halogen. Such compounds include acrylonitrile, α-bromoacrylonitrile, methacrylonitrile, ethacrylonitrile, and the like. The most preferred olefinically unsaturated nitrile is acrylonitrile.

The alkenylaromatics preferably include styrene and its analogs and homologs including α-methyl styrene and other α-alkyl styrenes, and ring substituted styrenes wherein the ring substituents include lower alkyl radicals such as methyl, ethyl, propyl, isopropyl butyl, sec-butyl or tert-butyl radicals and combinations thereof, halo or haloalkyl (halo is chloro or bromo) and hydrogen.

The alkenylaromatic/α,β-olefinically unsaturated nitrile copolymers include copolymer mixtures of those species set forth above and most advantageously styrene/acrylonitrile, styrene,acrylonitrile/α-methylstyrene and styrene/acrylonitrile/α-methyl styrene copolymers and the like. The copolymers which are preferred are those that exhibit high heat and high strength properties and have a number average molecular weight in the range of from about 100,000 to about 400,000, preferably higher if possible. The preferred copolymers contain about 50 to about 95 weight percent of alkenylaromatic species, and from 5 to about 50 weight percent of the olefinically unsaturated nitrile. Most preferred are those copolymers prepared by copolymerizing from about 15 to about 32 weight percent of α,β-olefinically unsaturated nitrile comonomer and about 68 to about 85 weight percent of alkenylaromatic comonomer. An example of a typical base is a copolymer consisting essentially of about 30 weight percent acrylonitrile and about 70 weight percent styrene. The copolymers of this invention are readily prepared by known methods of radical polymerization such as by bulk polymerization, solution polymerization, emulsion polymerization, etc.

Typical resin additives which may be dispersed in the base resin are desirably finely divided powdered or crystalline species. The powder preferably has a particle size of less than about 50 μm. Smaller particle sizes are preferred because the surface area exposed is greater as the particle size decreases. Examples of typical additives include anti-static agents, ultraviolet stabilizers, heat stabilizers, antioxidants, slip agents, anti-block agents, plasticizers, delustrants, flame retardants such as antimony oxide, fillers and extenders such as alumina, silica, clays and calcium carbonate, dispersing agents, surfactants, lubricants such as talc, glass fibers, blowing agents, other adjuvants such as pigments, dyes and colorants, and the like.

The pigments used to opacify and color the polycarbonates are those conventionally known to the skilled artisan for use in high molecular weight thermoplastic pigmentation. Examples of inorganic pigments include titanium dioxide, lithopone, zinc sulfide, antimony trioxide, cuprous oxide, cadmium reds, cinnabar, antimony vermilion, zinc yellow, chrome yellows, chrome oranges, cadmium yellow, antimony yellow, chrome greens, chrome oxide greens, cobalt blue, carbon blacks and the like. The organic pigments include examples such as azos, indanthrones and phthalocyanine and derivatives of the generic compounds and metal derivatives thereof.

The preferred method of preparing base concentrates is to dry blend the additive and the base resin methods known in the art. The dry blend is then molded or extrusion drawn to the desired form. While the particular manner of mixing these components is not particularly critical, sufficient mixing should be employed to ensure a uniform distribution of additive and base resin throughout the resulting blend. Base concentrates of this invention most preferably contain from about 35 to about 99 weight percent of copolymer base and from about 1 to about 65 weight percent of additive.

Alkenylaromatic/α,β-olefinically unsaturated nitrile base concentrates are superior to concentrates prepared using a carbonate polymer as a base. For example, concentrates prepared using a carbonate polymer as a base cannot be loaded with an additive such as titanium dioxide beyond about 30 weight percent without severe molecular weight loss of the resin, flow instabilities during processing and extreme brittleness (i.e., low impact resistance) of the extrudate. Conversely, the base resins of this invention require lower processing temperatures which allow for easier and less expensive processing. Additionally, the base resins are of lower cost and are capable of much higher additive loadings than carbonate polymer resins. Base resins of this invention are not as susceptible to impurities such as reactive cations, halide ions and moisture which adversely affect base resins containing carbonate polymer.

The powdered additives which are blended in the base resin of this invention are coated in such a fashion as to be protected by a barrier layer. The coating by the base resin prevents reaction of the particulate matter when the additive concentrate is let down in the carbonate polymer. For example, titanium dioxide contains small amounts of chloride ions which attack carbonate polymer phenolic moieties and cause yellowing and molecular weight degradation of the final product over time or as a result of high processing temperature. The barrier layer provided by the base resin acts to prevent such ions from interacting with the carbonate polymer and thus prevents yellowing the final molded product. The base resins of this invention are also less sensitive to water than carbonate polymer resins and thus by prepared without predrying the additive or base resin if properly vented extrusion or molding devices are employed. These factors make loadings of up to about 50 to about 60 percent titanium dioxide possible in the base concentrates of this invention.

A number of approaches are possible for making ready-to-mold colors in carbonate polymer resins. Among these, the master blend method offers a large advantage in reducing material handling. This method of coloring necessitates the use of a high percentage pigment concentrate with suitable flow, dispersion and brightness (i.e., low yellowing) properties. For example, a white pigmented concentrate may be used as a base onto which additional colorants are bonded, and the final blend will be free flowing and nondusting. The concentrate can be letdown with natural feedstock to the desired concentration by balanced weight feeding feedstock and concentrate into the feed hopper of an extruder or other compounding device. Letdown ratios in the range of about 10 to about 25 parts feedstock to one part concentrate are practical in such coloring operations. It is understood, of course, that other powdered additives may also be blended using the master blend methods and correspondingly different letdown ratios can be employed.

Another advantage of color and additive concentrates is observed in the cleanup of the handling apparatus after molding processes involving hard to remove colors. For example, in making black and gray ready-to-mold colors, carbon black (furnace black) is a preferred colorant to use. However, handling of any form of carbon black is a very dirty task that can result in severe contamination of all products and equipment in the immediate area. A large cost penalty due to cleanup and off-color materials can be associated with the use of furnace black in a powder form in a compounding plant where many colors in addition to blacks are made. One method for greatly reducing this kind of contamination is through the use of a carbon black filled concentrate of this invention which can contain up to about 35 weight percent carbon. The concentrate can be handled in the form of a resin pellet and the problems associated with black dust is eliminated.

It is also desirable to make a concentrate using a base resin and a foaming or blowing agent. Base concentrate resins are desirable that have low extrusion temperatures. Consequently, no premature decomposition of the blowing agent occurs as would be observed if concentrates were prepared using carbonate polymer resins. That is, concentrates using carbonate polymer as a base require high extrusion temperatures at which foaming agents typically decompose. Base concentrates prepared using alkenylaromatic/α,β-olefinically unsaturated nitrile copolymer as a base can be prepared at much lower extrusion temperatures than the corresponding carbonate polymer bases and can then be let down with carbonate polymer resins in a structural foam molding machine, thus avoiding the dusting problems of adding the foaming agents directly to the carbonate polymer pellets during molding operations.

The following examples are given to further illustrate the invention and its properties and should not be construed as limiting its scope. In the following examples, all parts and percentages are by weight unless otherwise indicated.

EXAMPLE 1

This example illustrates the fact that the addition of small amounts of styrene/acrylonitrile copolymer (SAN) to the polycarbonate resin does not significantly adversely affect the good physical properties of the polycarbonate resin. This example illustrates the compatibility of the base resin and the polycarbonate at small amounts of base resin.

To a 2850-g sample of a homopolycarbonate of bisphenol-A, having a weight average molecular weight of 32,000 as determined by gel permeation chromatography and sold under the trade name Merlon M50F-1000 by the Mobay Chemical Co. in the form of pellets (0.32 cm (dia)×0.32 cm (length), is added 150 g of a SAN copolymer containing about 30 percent acrylonitrile (AN) and having a weight average molecular weight of 180,000 as determined by gel permeation chromatography and sold under the trade name TYRIL ® 880 styrene-acrylonitrile resin by The Dow Chemical Company in the form of pellets (0.32 cm (dia.)×0.32 cm (length). The mixtures are tumble blended in several SAN copolymer/polycarbonate weight ratios. The samples are dried at 250° F. and melt blended in a single screw extruder equipped with a six element Koch static mixer.

The melt blended samples of polycarbonate and SAN copolymer/polycarbonate are again thoroughly dried at 250° F. in a forced air oven and molded into test specimens using a Newbury Model H1-30RS injection molding machine. Molding is done at a barrel temperature setting of about 575° F. and mold temperature setting of 175° F. A sample of the SAN is dried thoroughly at 175° F. This sample is molded into pellets (3 cm (dia.)×⅛ cm disks) on the same machine with a barrel temperature setting of 450° F. and mold temperature setting of 130° F.

Impact and tensile properties obtained for various blends containing from about 0.5 to about 10 weight percent SAN and prepared using methods similar to those used in preparing the 5 weight percent blend are presented in Table I.

TABLE I

| SAN Copolymer/-Polycarbonate[1] | Notched Izod Impact[2] | Yield Strength[3] | Ultimate Strength[3] |
| --- | --- | --- | --- |
| 0/100 | 17.61 | 8657 | 10,189 |
| 0.5/99.5 | 17.52 | 8637 | 10,441 |
| 1/99 | 18.94 | 8676 | 10,577 |
| 2/98 | 18.65 | 8729 | 10,336 |
| 5/95 | 19.55 | 8836 | 10,450 |
| 10/90 | 2.80 | 9065 | 10,634 |
| 100/0 | .211 | — | 10,604 |

[1]Amounts shown are in weight percent SAN copolymer relative to that of polycarbonate.
[2]Reported in ft lb/in. and prepared and conditioned according to ASTM D-256.
[3]Reported in psi and prepared and conditioned according to ASTM D-638.

Notched Izod impact remains high at 5 percent SAN resin addition. In fact, at the 5 percent level, the notches Izod impact value is significantly higher than the polycarbonate control. However, with 10 percent SAN blend, the impact value is drastically reduced to 2.80. This indicates that at levels somewhat above 5 percent SAN in polycarbonate the blend is adversely affected by a relatively high increase in notch sensitivity over polycarbonate.

Tensile strength properties of the polycarbonate are not adversely affected by SAN addition up to about 10 percent. Similar behavior is noted for elongation and modulus properties.

Heat distortion and melt flow rate behavior of samples prepared as in Example 1 is presented in Table II.

TABLE II

| SAN Copolymer/-Polycarbonate[1] | Heat Distortion[2] | Melt Flow Rate[3] |
| --- | --- | --- |
| 0/100 | 159 | 4.25 |
| 0.5/99.5 | 158.5 | 3.93 |
| 1/99 | 161 | 4.08 |
| 2/98 | 158 | 4.07 |
| 5/95 | 158.5 | 4.36 |
| 10/90 | 157.5 | 5.06 |
| 100/0 | 103 | 11.9 |

[1]Amounts shown are in weight percent SAN copolymer relative to that of polycarbonate.
[2]Vicat softening temperature is reported in °C. and prepared and conditioned according to ASTM D-1525.
[3]Measured in g/10 min. and prepared and conditioned according to ASTM D-1238 (Condition O, 300° C., 1200 g).

Neither heat distortion nor melt flow of the polycarbonate changes appreciably when SAN resin is added up to about 10 percent.

EXAMPLE 2

Pigmented concentrates are prepared in a SAN base resin using a 50 weight percent sample of TiO$_2$ obtained from E. I. duPont deNemours & Co. and sold commercially as TiO$_2$ R-960, and a 50 weight percent sampe of TYRIL ® 880 styrene-acrylonitrile resin. The powdered pigment is added to the SAN pellets and mixed with a Banbury mixer. The concentrates so formed exhibit good pigment dispersion, that is, are free from pigment agglomeration and uniform distribution of pigment throughout the concentrate, and are easily transportable without loss of pigment.

EXAMPLE 3

A pigmented concentrate is prepared by blending 50 percent TiO$_2$ R-960 and 50 percent TYRIL ® 880 with an antioxidant stabilizer system consisting of a 0.1 percent tetrakis(2,4-ditertiary butylphenyl)-4,4'-biphenyline diphosphonite solid commercially under the trade name Sandostab P-EPQ sold by Sandoz Colors and Chemicals, and 0.025 percent octadioctadecyl-3,5-ditertiary-4'-hydroxyhydrocinnamate sold commercially under the trade name Irganox 1076 by Geigy Industrial Chemicals. The concentrate is prepared by mixing in a Banbury mixer. The concentrates are let down in polycarbonate obtained from Mitsubishi Chemical Industries, Ltd. under the trade name Novarex 7025 PJ, and of molecular weight of about 30,000 as measured by gel permeation chromatography. The resulting blend contains 2 percent TiO$_2$. After blending, the sample is dried for 4 hours at 250° F. and immediately melt blended in a single screw extruder equipped with a 6-element Koch static mixer and downstream pelletizing equipment. A test sample (designated Sample No. S-1) is then extruded using a Model V-1250-20T TEC supplied by Entwistle Co. Several other samples (designated Sample Nos. C$_1$, C$_2$ and C$_3$) are prepared in a similar fashion for comparison purposes. The samples are oven dried at 250° F. and molded into standard test bars (2 in. (dia.)×⅛ in disks). The molding of all samples is done using a Newbury Model H1-30RS injection molding machine with barrel set at 575° F. and mold temperature at 175° F. Comparative results are set forth in Table III.

observed when the TiO$_2$ is added to the polycarbonate. The sample letdown with the TYRIL ® 880 concentrate (Sample No. S-1) does exhibit less yellowness as compared to letdowns made from polycarbonate base concentrates (Sample Nos. C$_2$ and C$_3$). The lower melt flow observed for the samples containing polycarbonate resin concentrate may be explained by the addition of a relatively low molecular weight resin additive to the polycarbonate sample. The yellowing of the sample containing the SAN base concentrate is distinctly less yellow than letdowns prepared from the polycarbonate base concentrates.

EXAMPLE 4

A foaming agent concentrate is prepared by dry blending 93.75 percent predried TYRIL ® 880 pellets with 6.25 percent decomposable foaming agent 5-phenyltetrazole sold commercially as Expandex OX-SPT by Stepan Chemical Co. The blend is extruded into pellets (0.32 cm (dia.)×0.32 cm (length) at 380° F., a temperature below that at which foaming occurs. The concentrate is mixed using mixing techniques described earlier in a ratio of 1 part concentrate pellet to 24 parts polycarbonate (Merlon M40-1000). The blend is molded at 575° F. into ⅜ inch thick bars and foamed to approximately 85 percent of the density of the polycarbonate. The characteristic pink color of the foaming agent disappears after molding the polycarbonate sample, indicating that decomposition of the foaming agent has occurred.

What is claimed is:

1. An improved process for dispersing a dry powdered or crystalline additive into a carbonate polymer which comprises preparing a base concentrate by dry blending at a temperature lower than that employed in processing a carbonate polymer, a powdered or crystalline additive and a copolymer of an alkenylaromatic monomer and an α,β-olefinically unsaturated nitrile monomer; molding or extruding the base concentrate; dry blending said base concentrate with a carbonate polymer; and molding or extruding the carbonate polymer/base concentrate.

2. A process of claim 1 wherein said carbonate polymer is homopolycarbonate of bisphenol-A.

3. A process of claim 1 wherein said powdered or

TABLE III

| | PHYSICAL PROPERTIES OF VARIOUS TiO$_2$/POLYCARBONATE BLENDS | | | | | | FLAMMABILITY AND OPTICAL PROPERTIES OF VARIOUS TiO$_2$/POLYCARBONATE BLENDS | | | | | |
|---|---|---|---|---|---|---|---|---|---|---|---|---|
| | Tensile Strength[1] (psi) | | Elongation[2] (%) | | Modulus[1] (psi) ×10$^{-5}$ | Notched Izod Impact[2] (ft.lb/in.) | Melt Flow[3] (300° C., 1200 g) (g/10 min) | Heat Distortion (°C.) | | UL-94 Test Data[6] | | Oxygen Index[7] (% O$_2$) | Yellowness Index[8] |
| Sample | Yield | Rupture | Yield | Rupture | | | | Vicat | DTUL[5] | Avg. Flame Time (sec) | Rating | | |
| C$_1$ | 8,500 | 9,160 | 6.3 | 100 | 3.32 | 17.2 | 6.0 | 160 | 151 | 14.5 | HB | 29.2 | — |
| S-1 | 8,820 | 10,120 | 6.2 | 130 | 3.36 | 16.7 | 8.8 | 159 | 127 | 24.9 | HB | 25.6 | 9.0 |
| C$_2$ | 8,680 | 9,900 | 6.3 | 130 | 3.43 | 15.5 | 10.0 | 158 | 134 | 17.9 | HB | 26.6 | 11.7 |
| C$_3$ | 8,680 | 9,690 | 6.3 | 120 | 3.37 | 15.90 | 9.8 | 158 | 132 | 19.1 | HB | 26.6 | 11.6 |

C$_1$ Novarex 7025PJ polycarbonate control. Not an example of this invention.
S-1 Novarex 7025PJ polycarbonate plus SAN/TiO$_2$ concentrate mixture. An example of this invention.
C$_2$ Novarex 7025PJ polycarbonate, 0.1 percent Sandostab P-EPQ, 0.025 percent Irganox 1076, 6.7 percent concentrate (30/70, TiO$_2$/polycarbonate where polycarbonate is Merlon M-40-F1000). Extrusion of concentrate performed with American Leistritz Extruder Co., Model LSM-30.34.
C$_3$ Composition as in C$_2$, however, concentrate processed on Werner & Pfleiderer Co. Model ZSK-30.
[1]Tensile, elongation and modulus measured per ASTM D-638.
[2]Notched Izod impact measured per ASTM D-256.
[3]Melt flow (Condition 0; 300° C., 1200 g) measured by ASTM D-1238.
[4]Vicat softening temperature measured by ASTM D-1525.
[5]Deflection temperature under load (DTUL-264 psi) measured by ASTM D-648.
[6]Vertical burn rate (⅛ inch thickness) measured by UL Standard 94.
[7]Limiting oxygen index (LOI) measured by ASTM D-2863.
[8]Yellowness measured by reflectance as a yellowness index using a Hunterlab Model D25P-2 colorimeter.

As indicated in Table III, no significant adverse effects in physical properties of the polycarbonate are crystalline additive is a pigment.

4. A process of claim 1 wherein said copolymer is prepared from copolymerizing about 15 to about 32 weight percent of α,β-olefinically unsaturated nitrile monomer with about 68 to about 85 weight percent alkenylaromatic monomer.

5. A process of claim 4 wherein said copolymer is styrene/acrylonitrile copolymer.

6. A process of claim 1 wherein said base concentrate consists essentially of from about 35 to about 99 weight percent of said copolymer and from about 1 to about 65 weight percent of said additive.

7. A process of claim 1 wherein said base concentrate consists essentially of from about 65 to about 99 weight percent of said copolymer and from about 1 to about 35 weight percent of said additive.

8. A process of claim 1 wherein said powdered or crystalline additive is a foaming agent.

9. A process of claim 1 wherein said carbonate polymer/base concentrate comprises from about 95 to about 99 weight percent carbonate polymer and from about 1 to about 5 weight percent base concentrate.

* * * * *